US008649052B2

(12) United States Patent
Hoover et al.

(10) Patent No.: US 8,649,052 B2
(45) Date of Patent: Feb. 11, 2014

(54) IMAGE ON PAPER REGISTRATION USING TRANSFER SURFACE MARKS

(75) Inventors: Martin Edward Hoover, Rochester, NY (US); Jack Gaynor Elliot, Penfield, NY (US); Vladimir Kozitsky, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 798 days.

(21) Appl. No.: 12/813,645

(22) Filed: Jun. 11, 2010

(65) Prior Publication Data

US 2011/0304886 A1 Dec. 15, 2011

(51) Int. Cl.

*G06K 15/00* (2006.01)
*G06F 3/12* (2006.01)
*G06F 15/10* (2006.01)

(52) U.S. Cl.

USPC ........ 358/1.18; 358/1.13; 358/1.15; 358/1.14

(58) Field of Classification Search

USPC .................. 358/515, 521, 1.1–1.9, 1.11–1.18
See application file for complete search history.

(56) References Cited

U.S. PATENT DOCUMENTS 5,394,223 A * 2/1995 Hart et al. .................... 399/165
5,555,084 A * 9/1996 Vetromile et al. .............. 399/16
6,373,042 B1 4/2002 Kretschmann et al.
7,106,477 B2 9/2006 Horobin
7,420,719 B2 * 9/2008 Mongeon ...................... 358/504
7,630,653 B2 * 12/2009 Bonino ........................... 399/15
2003/0201598 A1 10/2003 Walsh et al.
2005/0286922 A1 * 12/2005 Oki ................................ 399/75
2008/0278735 A1 11/2008 Wang et al.
2009/0147298 A1 * 6/2009 Takahashi et al. ........... 358/1.15

* cited by examiner

*Primary Examiner* — King Poon
*Assistant Examiner* — Ibrahim Siddo
(74) *Attorney, Agent, or Firm* — Hoffmann & Baron, LLP

(57) ABSTRACT

A method of adjusting the registration of an image printed on sheets. The method including determining a first image location relative to a first sheet, adjusting a second image to be printed based on the determined first image location and printing the adjusted second image to subsequent sheet(s). The first image location determination made by measuring at least one dimension of a fiducial mark disposed directly on a transfer surface. The fiducial mark formed by the engagement of the first sheet with the transfer surface, whereby an inner edge of the fiducial mark forms at least a partial outline of a periphery of the first sheet. Each measured fiducial mark dimension extending from the fiducial mark inner edge to an outer edge of the fiducial mark. The fiducial mark outer edge being disposed remote from the at least partial outline of the first sheet periphery.

18 Claims, 9 Drawing Sheets

IMAGE ON PAPER REGISTRATION USING TRANSFER SURFACE MARKS

TECHNICAL FIELD

The presently disclosed technologies are directed to automatically adjusting the registration of an image transferred to sheets by measuring marks disposed in close proximity to representations of sheet edges in an image transfer assembly, such as a printing system.

BACKGROUND

Accurate Image On Paper (IOP) registration is generally desirable to users and consumers in the printing and/or image reproduction industry. Single-side (also referred to as "simplex") IOP registration focuses on the location of image marks with respect to the edges of the paper. Also, double-sided (also referred to as "duplex") or side 1 to side 2 IOP registration focuses on the location of image marks on side 2 with respect to corresponding image marks on side 1. The primary sources of simplex IOP registration error include the sheet registration module, the Raster Output Scanner (ROS) module, and the photoreceptor module. The precision and accuracy of these modules directly impact the simplex IOP registration. For duplex registration, in addition to the simplex sources, xerographic printers suffer from the shrinkage of paper during fusing. Basically, the paper is smaller when the duplex image is transferred than it was for the simplex image, effectively making the side 1 image smaller with respect to that of side 2. Also, there is significant variation in paper shrinkage within (sheet-to-sheet) and between different types of substrate media.

Contemporary setup procedures for IOP registration require calibration of image-on-paper (IOP) registration systems is often time consuming and cumbersome. Such procedures employ a separate image scanning device and a test pattern that includes a 2D grid of dots (a pattern of marks) on a central portion of a test sheet. For duplex registration the grid of dots is included on each side of the test sheet. The test pattern is scanned and the resulting image is processed to find the macroscopic location of the entire image with respect to two edges (a single corner) of the paper as well as the linear and non-linear magnification errors within the image. Such methods require the scanning device to be very precise and consistent (repeatable). Also those methods requires a calibration reference pattern to remove accuracy errors in the scan area. Accordingly, such contemporary methods do not lend themselves to an inline sheet fed image scanning device. Instead, the motion quality and controlled environment of an offline flatbed image scanning device is required to meet the required measurement precision and accuracy.

Measurements of an absolute IOP registration across a print, especially a large print, are prone to errors caused by the image scanning device measuring across long distances of the prints. Using a flatbed document scanner, a test pattern is measured with respect to a reference frame established at a single corner of the test paper and aligned with one of the edges of the print. Measurements are made across the large span of the print with the farthest being near the opposite corner of the print, relative to the reference corner. Often, this can be a very long distance considering some printers print onto 14.33"×22.5" sheets. Positional errors in the scanned image (the test pattern) accumulate over long distances such that the errors in positional or location measurements using the scanned image are as significant as the errors in the test prints. Thus, in order to measure absolute locations over long spans such systems require a precision scanning device, such as a very repeatable flatbed scanner, and some calibration reference target that works to compensate or calibrate out the positional measurement errors across the two dimensional scan area.

Accordingly, it would be desirable to provide a method and/or system which can adjust the registration of images on sheets in a marking device, which overcomes the shortcoming of the prior art. In particular, a system and/or method that can adjust an image size, image shear, image target position and/or image target orientation of a transfer image based on measurements of fiduciary marks on a transfer surface denoting sheet edges and/or corners.

SUMMARY

According to aspects described herein, there is disclosed a method of adjusting the registration of an image printed on sheets in a marking device, wherein the sheets each include a periphery defined by sheet edges. The method includes determining a first image location relative to a first sheet, adjusting a second image to be printed and printing the adjusted second image to a second sheet. The first image location determination being made by measuring at least one dimension of a side-one fiducial mark disposed directly on a first transfer surface. The side-one fiducial mark formed at least partially by the engagement of the first sheet with the transfer surface, whereby a first edge of the side-one fiducial mark forms at least a partial outline of a periphery of the first sheet. Each measured side-one fiducial mark dimension representing a distance between the first edge of the side-one fiducial mark and a second edge of the side-one fiducial mark. The side-one fiducial mark second edge being disposed remote from the at least partial outline of the first sheet periphery. The second image adjustment being made by changing, relative to a second sheet, at least one of a size, shear, position and orientation of the second image based on the determined first image location.

Additionally, the at least one dimension can include at least two separate dimensions of the fiducial mark. Each dimension can extend to a different edge, wherein the different edges can be disposed on different sides of the fiducial mark. Also, the at least partial outline can include at least two separate corners of the first sheet periphery. The fiducial mark can include at least two separate fiducial marks each forming separate portions of the at least partial outline. Additionally, the adjustment of the second image can include positioning the second image on the second sheet relative to at least one second sheet edge.

Further, the method can include determining a third image location relative to a third sheet by measuring at least one dimension of a side-two fiducial mark disposed directly on a second transfer surface. The side-two fiducial mark can be formed at least partially by the engagement of the third sheet with the second transfer surface, whereby a first edge of the side-two fiducial mark forms at least a partial outline of a periphery of the third sheet. Each measured side-two fiducial mark dimension can represent a distance between the first edge of the side-two fiducial mark and a second edge of the side-two fiducial mark. The side-two fiducial mark second edge can be disposed remote from the at least partial outline of the third sheet periphery. Also, a fourth image can be adjusted to be printed by changing, relative to a fourth sheet, at least one of a size, shear, position and orientation of the fourth image based on the determined third image location. Further, the fourth image can be transferred to the fourth sheet. Further, the adjustment of the fourth image can include scaling the fourth image to match the size of the adjusted second image. Also, the side-one fiducial mark can include more than one separate fiducial mark, wherein each fiducial mark is spaced apart from each other. Additionally, the transfer surface can include at least one of a photoreceptor belt, an intermediate transfer belt and an imaging drum. Also, the second transfer surface can be the first transfer surface or the first and second transfer surfaces can be remote and separate from one another.

According to other aspects described herein, there is provided a system for adjusting the registration of images printed on sheets. The system includes a marking device for transferring images to sheets, an image sensing device for measuring fiducial marks and a controller. The marking device marking a first sheet with a first portion of a first image, wherein when the first image first portion is applied to the first sheet a second portion of the first image extends beyond a periphery of the first sheet. The first and second image portions forming a common continuous mark prior to the first image first portion being applied to the first sheet. Also, the first image second portion forming a first fiducial mark. The image sensing device measuring at least one dimension of the first fiducial mark, wherein a first edge of the first fiducial mark represents a partial outline of a first periphery of the first sheet. Each first fiducial mark measured dimension representing a distance between the first edge of the first fiducial mark and a second edge of the first fiducial mark. Additionally, the controller is operatively coupled to the marking device and the image sensing device. The controller adjusting a second image by changing relative to a second sheet at least one of a size, shear, position and orientation of the second image based on the measured at least one measured dimension of the first fiducial mark, whereby the marking device transfers the adjusted second image to the second sheet.

Additionally, the adjustment of the second image can include centering the second image on the second sheet. Also, the at least one dimension can include at least two separate dimensions of the fiducial mark, wherein each of the at least two separate dimensions can extend to a different side of the first fiducial mark. Further, the at least partial outline can include at least two separate corners of the first sheet first periphery. Further still, the first fiducial mark can include corners representing more than one corner of the first sheet periphery partial outline. The first fiducial mark can also include at least two separate first fiducial marks each forming separate portions of the first sheet peripheral partial outline.

Further, the marking device can mark an opposed side of the first sheet with a first portion of a third image. The third image first portion can be applied to the first sheet opposed side while a second portion of the third image extends beyond a second periphery of the first sheet. The first and second portions of the third image forming a common continuous mark at least prior to the third image first portion being applied to the first sheet opposed side. The third image second portions can form a second fiducial mark. Also, the image sensing device can measure at least one dimension of the second fiducial mark, wherein a first edge of the second fiducial mark represents a partial outline of the second periphery of the first sheet. Each second fiducial mark measured dimension can represent a distance between the first edge of the second fiducial mark and a second edge of the second fiducial mark. Also, the controller can adjust a fourth image by changing relative to an opposed side of the second sheet at least one of a size, shear, position and orientation of the fourth image based on the measured at least one dimension of the second fiducial mark, whereby the marking device transfers the adjusted fourth image to the opposed side of the second sheet.

Further still, the adjustment of the fourth image can include scaling the fourth image to match the size of the adjusted second image. Also, the first fiducial mark can include more than one first fiducial mark, wherein each of the more than one first fiducial marks is spaced apart from each other. Each of the first fiducial marks can be formed closest to a different corner of the first sheet. Additionally, the first fiducial mark can include one continuous fiducial mark, wherein different portions of the one continuous fiducial mark are used to when measuring the first fiducial mark.

These and other aspects, objectives, features, and advantages of the disclosed technologies will become apparent from the following detailed description of illustrative embodiments thereof, which is to be read in connection with the accompanying drawings.

DETAILED DESCRIPTION

Figure 1:
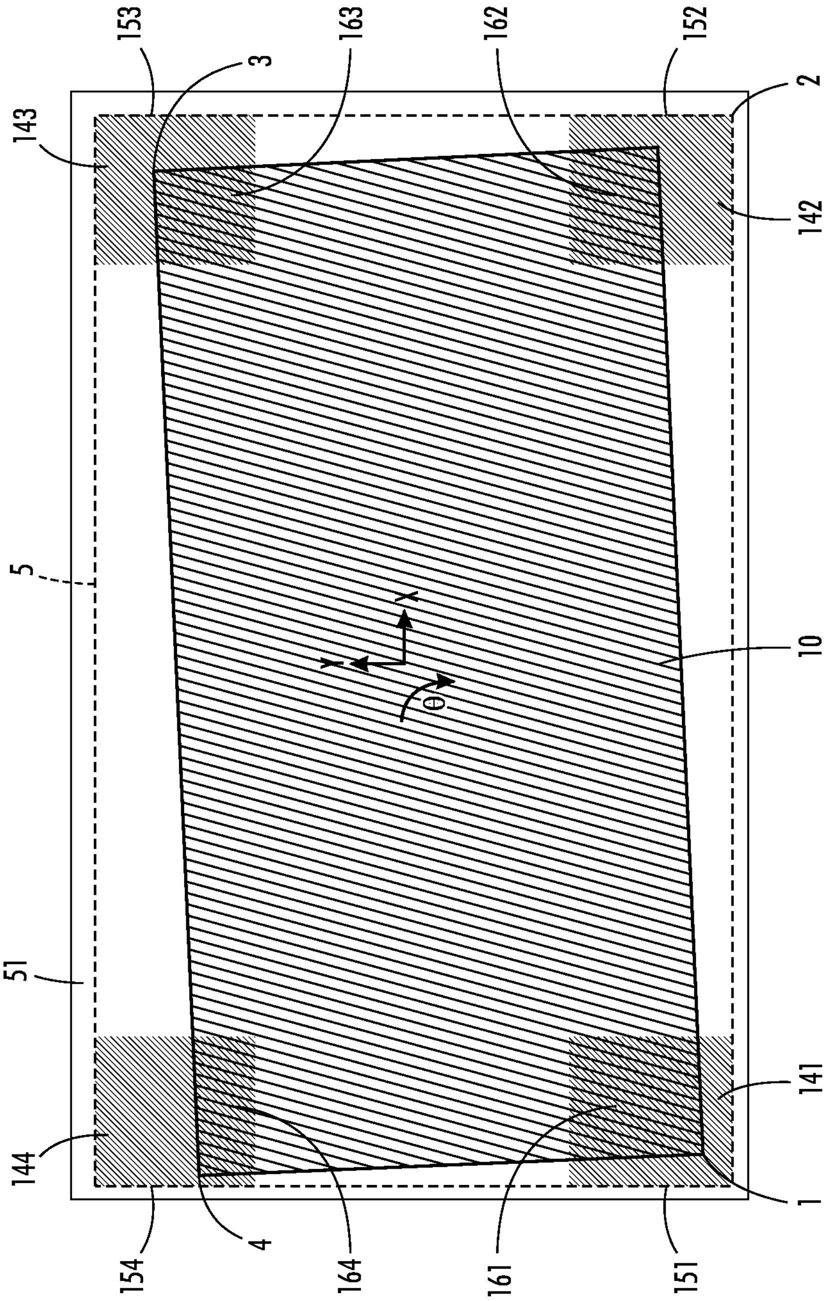
FIG. 1 is a schematic plan view of a sheet on a transfer surface with a first image there between for adjusting the registration of a images transferred in a media handling assembly in accordance with an aspect of the disclosed technologies.

Describing now in further detail these exemplary embodiments with reference to the Figures. In accordance with aspects of the technologies disclosed herein, apparatus, systems and methods are disclosed for making adjustments needed to properly register images transferred to sheets. It should be understood that these apparatus, systems and methods can be used in one or more select locations of the paper path or paths of various conventional media handling assemblies. Thus, only a portion of an exemplary media handling assembly path are illustrated and discussed herein.

The methods herein can be used as part of a setup procedure for an image registration apparatus and/or system, such as any marking device, particularly a printing assembly. Alternatively, the methods herein can be used continuously as part of an image registration system, in order to maintain and ensure accurate image placement. The methods and systems described herein measure a plurality of fiducial marks, or a plurality of portions of at least one continuous mark, that are formed in close proximity to the corners of a sheet. Fiducial marks in the form of patches are transferred to a sheet, such that during the transfer process a portion of each patch extends partially beyond the sheet edges. Thus, while a portion of the patch gets transferred to the sheet, the extended portions of the patch beyond the sheet edges do not. It is those extended portions of the patches, which do not get transferred to the sheet, that can be measured to determine characteristics of the sheet, as well as an image transferred thereto. In this way, the sheet acts as a mask or stencil, forming an outline of the sheet's own edges by leaving behind those extended portions of the patch on a photoreceptor belt, intermediate transfer belt or even an imaging drum. Such a sheet outline can be used as a frame of reference for measurements and adjustments for the placement of images on subsequent sheets.

As used herein, a "printer," "printing assembly" or "printing system" refers to one or more devices used to generate "printouts" or a print outputting function, which refers to the reproduction of information on "substrate media" for any purpose. A "printer," "printing assembly" or "printing system" as used herein encompasses any apparatus, such as a digital copier, bookmaking machine, facsimile machine, multi-function machine, etc. which performs a print outputting function.

A printer, printing assembly or printing system as referred to herein are synonymous and can use an "electrostatographic process" to generate printouts, which refers to forming and using electrostatic charged patterns to record and reproduce information, a "xerographic process", which refers to the use of a resinous powder on an electrically charged plate record and reproduce information, or other suitable processes for generating printouts, such as an ink jet process, a liquid ink process, a solid ink process, and the like. Also, a printer can print and/or handle monochrome or color image data, as well as transfer or impress marks by indenting or raising a surface.

As used herein, "sheet" or "sheet of paper" refers to, for example, paper, transparencies, parchment, film, fabric, plastic, photo-finishing papers or other coated or non-coated substrate media in the form of a web upon which information or markings can be visualized and/or reproduced. While specific reference herein is made to a sheet or paper, it should be understood that any substrate media in the form of a web amounts to a reasonable equivalent thereto. Also, the "leading edge" of a substrate media refers to an edge of the sheet that is furthest downstream in the process direction.

As used herein, a "media handling assembly" refers to one or more devices used for handling and/or transporting a sheet, including feeding, printing, finishing, registration and transport systems.

As used herein, a "marking device" refers to one or more devices used to print, transfer and/or fix a mark onto a sheet, such as that used to form one or more images, marks, text or other indicia, such as electrophotography, iconography, magnetography or other re-imaging or marking processes. Such marking devices can include ink jet systems, image transfer assemblies that transfer one or more latent images or other systems that can apply one or more impressions.

As used herein, "sensor" refers to a device that responds to a physical stimulus and transmits a resulting impulse for the measurement and/or operation of controls. Such sensors include those that use pressure, light, motion, heat, sound and magnetism. Also, each of such sensors as refers to herein can include one or more point sensors and/or array sensors for detecting and/or measuring characteristics of a substrate media, such as speed, orientation, process or cross-process position and even the size of the substrate media. Thus, reference herein to a "sensor" can include more than one sensor.

As used herein, "skew" refers to a physical orientation of an image relative to the substrate media upon which it is affixed. In particular, skew refers to a misalignment, slant or oblique orientation of an edge of the substrate media relative to an image placed thereon.

As used herein an image position is distinguished from its location. The position of an image defines the place occupied by the image relative to the sheet and changes in position refer to one or more linear shifts of the image along an axis, independent of any size, shear or orientation changes to the image. In contrast, the image location defines the particular space and/or boundaries occupied by the image. Thus, the image location includes all aspects of the image geometry such as image size, shear, orientation and position. The measurements described herein are intended to improve the accuracy of the image position and/or location, as desired.

As used herein, the terms "process" and "process direction" refer to a process of moving, transporting and/or handling a substrate media. The process direction is a flow path the substrate media moves in during the process. A "cross-process direction" is perpendicular to the process direction and generally extends across and along the web of the substrate media.

As used herein, the term "fiducial mark" or "printed fiducial mark" refers to a designated point, line, mark or portion of an impression, mark or image disposed on a substrate media, used as a fixed basis of comparison. A fiducial mark is indicative of the location of a printing. Fiducial marks tend to be marks that have a shape that enables more accurate positional detection or measurement.

As used herein, the term "image sensing device", "image scanning device" or "scanner" refers to one or more devices using optics, sensors, photography or other hardware and software for detecting and/or measuring the intensities of one or more images or marks on a sheet, such as for a raster input device. Such devices can include scanners, cameras or other image sensing techniques.

As used herein, the term "transfer surface" is a surface on which marking material, such as ink or toner, is retained in image wise fashion and subsequently transferred to a print sheet or other member coming into contact or proximity therewith. In a standard xerographic or "laser" printer, such a transfer surface is typically in the form of a charge-retentive photoreceptor. In many designs of color xerographic printers, a series of photoreceptors are arranged around a common intermediate transfer belt, on which primary-color partial images are accumulated for transfer to a sheet as a full-color image; in such a design, either any photoreceptor and/or the intermediate transfer belt itself can be considered a transfer surface. In certain designs of ink-jet printers, ink jet ejectors place ink on a rotatable drum or belt for subsequent transfer to a print sheet; such a belt or drum may be considered a transfer surface.

In accordance with aspects of the disclosed technologies, the methods and systems herein treat the periphery of a sheet of paper as the reference for placement of an image and any potential adjustments needed to that image size, shear, position and/or orientation. Taking a plurality of measurements that span relatively short distances relaxes the precision and accuracy traditionally required from an image sensing device. This is achieved in part because measurements over relatively short distances are less sensitive to errors. Thus, it can be desirable to use short distance measurements in order to tightly register image-on-paper (IOP) registration relative to the size of the paper, even in duplex printing.

Scanned images can easily have positional errors, such as spatial distortions that will accumulate into significant errors in positional measurements across longer lengths. The longer the distance, the larger the accumulated error. An aspect of the methods and systems disclosed herein is to relax the error in locational or positional measurement by measuring as short a distance as is possible and/or practical. Another aspect of relaxation is to avoid the need to calibrate positional errors out of the scanned image. There are many types of spatial distortions commonly found in line scan images. How much error will accumulate depends on the nature of the spatial distortion. One of the most common and more problematic error types is an image magnification error or very low frequency errors.

For example, consider a scanner that has a magnification error of 1%. In other words rather than having the nominal spatial resolution of 600 dpi, the image has 1% magnification error which is equivalent to 606 dpi. Measuring a mark location relative to a paper edge across a distance of 1 inch, gives a an error in the positional measurement of 1%, which equates to ~254 microns. For IOP registration measurements with resolution accuracy in the 50 micron range, an error in the 250 micron range could be considered to great. Under that circumstance, a 1 inch measurement would be too far away with this large of a scanner magnification error. However, one must consider that there are tradeoffs between how much positional error there is in the image sensing/scanning method used and how far apart the marks are with respect to the edges. If the errors in the scan image are smaller, the proximity of the marks next to edges can be made larger and visa versa.

As a further example, consider a scan image positional or magnification error is less than 0.1%. Thus, the positional error accumulated across a 1 inch span is only about 25 microns, which can be considered an acceptable accuracy for measurement of IOP Registration. Nonetheless, 1 inch may still be quite a bit larger than needed for practical purposes. Most printers have the ability to print much closer to the edges of sheets. Another consideration could be extreme circumstances when IOP registration has not been setup at all. Under such circumstances the image may be misaligned by several millimeters such that the corner marks of the image fall off the edge of the paper. Thus, measuring less than 10 mm across a mark could work well in accordance with various aspects of the disclosed technologies. Keeping measurements under such small distances can minimize errors and/or the magnitude of errors during image registration.

Accordingly, fiducial marks can be used to measure the distances between an outer edge of a sheet and a nearby opposed outer edge of the fiducial mark that lies outside the periphery of the sheet. The measurements across the relatively small fiducial marks can determine the position of the sheet, which is then used to adjust a desired transfer image before it is transferred to subsequent sheets. Such adjustments can include centering the transfer image on the sheets, adjusting for shear in an image, registering the image relative to at least one sheet corner or changing the magnification of the image to accommodate predesignated sheet margins. Non-linear magnification or distortion errors of the scanned fiducial mark need not be considered. For one thing, non-linear adjustment of an image to be transferred is not often available in image transfer systems. Additionally, non-linear errors are often dominated by linear errors.

The methods and systems described herein work well for users concerned mainly with where the transfer image is finally placed with respect to the sheet edges. For such users, an image on paper generally looks good as long as the image is centered and scaled properly with respect to the size of the paper. In other words, a print can look good to some, if its image is centered and scaled with respect to the size of the paper. Also, for duplex printing if the side 1 image is well aligned with the side 2 image. This is not to say the absolute image size does not matter. However, where absolute image size is important to the user, a supplemental procedure could be added to maintain that image size.

An aspect of the disclosed technologies herein determines an image size (a linear magnification) relative to a sheet by measuring portions of fiducial marks located in close proximity to the edges, and particularly the corners, of that sheet. Those measurements are then used to determine a frame of reference between the sheet of paper and the images transferred thereon. Subsequent images transferred to similar sheets can be automatically positioned relative to the sheets (ex., for centering), scaled to fit the size of sheets being used (even considering predefined sheet margins) or rotated to adjust for skew. A resizing of the image relative to the sheet can be used in applications where absolute image size is not the most significant factor determining image quality. Another aspect of the disclosed technologies assumes that page distortions (non-linear magnification distortions) are either negligible or need not be considered in the IOP registration setup.

Additionally, in accordance with yet another aspect of the disclosed technologies herein, the size and placement of a back side image (side 2) relative to the front side image (side 1) can be accomplished. Thus, regardless of whether the side 1 transfer image was scaled to fit the measured paper size or was maintained with an absolute image size, the side 2 image can be automatically scaled to match the size 1 image after it has been transferred and fused to the paper. Alternatively, an absolute image size can be maintained for the side 2 transfer image as well.

In contrast with contemporary off-line measurement techniques, an aspect of the disclosed technologies includes using one or more image sensing devices that can make in-line measurements. In this way, automated measurements can be made, thus improving workflow and speeding-up the calibration an setup of a marking device, such as a printer. Preferably, the image sensing device is located within a portion of the image transfer assembly that can visualize a transfer surface associated with transferring an image to a sheet.

Figure 8:
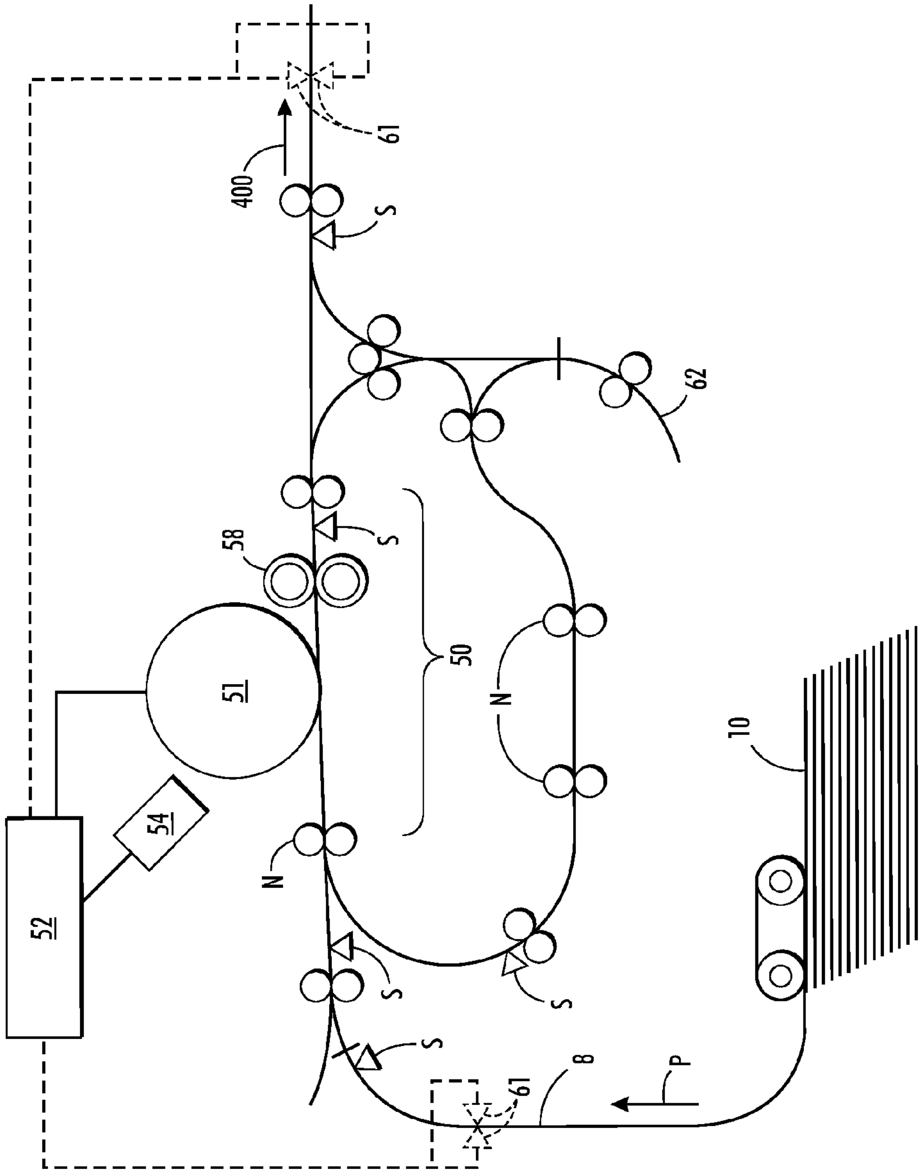
FIG. 8 is a schematic representation of a marking device, including a duplex sheet handling path in accordance with an aspect of the disclosed technologies.

FIG. 8 shows a system in accordance with various aspects of the disclosed technologies. As shown, at least one sheet 10 is provided (actually a stack of sheets 10 are shown) that can be delivered for scanning and image transfer or printing as indicated above. In the exemplary embodiment shown, a sheet feeder is provided to convey the sheets 10 along a process direction P of the one or more belts 8 or other sheet conveying mechanism. Throughout the system, various sensors S are shown which can determine different aspects with regard to sheet handling. Also, as part of the system various sets of sheet handling Nips N are provided for conveying the sheets through the system. The sheets 10 are then directed to a transfer station 50 where an image can be secured to the sheet 10. As with contemporary image transfer assemblies, the system can include a controller 52, print engine 54, image transfer surface 51 (an exemplary imaging drum is shown), fuser 58 as well as other elements. However, it should be understood that other marking devices, such as an inkjet assembly, could be used to print an image onto the sheet(s). Also, the belt 8 or conveying system for handling the sheets 10 can be designed to automatically convey the sheets 10 through the transfer station 50 one or more times. Such a system can be provided with a sheet inverter 62 which can flip the sheet for duplex printing or image sensing.

Another aspect of the disclosed technologies is that the system includes one or more image sensing devices 60. FIG. 8 includes three different locations for one or more in-line image sensing devices 60. Alternatively, an image sensing device 60 can be provided as a separate apparatus. In accordance with an aspect of the disclosed technologies herein, at least one image sensing device 60 is located for scanning the transfer surface 51 after the fiducial marks have been formed thereon. The location of the image sensing device 60 adjacent the upper right quadrant of the cylindrical drum is for exemplary purposes only. Regardless of its location, the output from the image sensing device 60 is fed to a transfer station controller 52 or to the transfer station 50 by other means. In other words, such a scanning device 60 need not be included in-line along the process path P. Additional sheet image sensing devices 61 can be located throughout the process path as illustrated.

In accordance with the embodiments herein, a sheet of paper 10 can be conveyed in the process direction P through the transfer station once and be looped back around in a clockwise direction along the belt system 8 so that it returns to the transfer station 50 once again. On the first pass the sheet receives a first image (the preliminary latent image). On the second pass, the adjusted second image can be secured to the sheet. It should be understood that where additional image sensing devices are provided on both sides of the sheet path P, they need not be directly opposed from one another.

For duplex printing, in the first pass the sheet can receive the first image, so the fiducial marks can be scanned and measured thereafter. After measurement, the transfer surface would be cleared in order to received a subsequent image. In the second pass the sheet can be conveyed to the inverter 62 and conveyed back through the transfer station along the loop in a clockwise direction in order to receive the third image onto side two of the same sheet. Thereafter, the side two fiducial marks can be measured and the transfer surface cleared for subsequent image(s). Then a third pass can be used to apply a fourth image to side two of the sheet, followed by a trip to the inverter so the sheet can once again reach the transfer station to receive the side one second image. If the first and second scan loops are only intended as a setup procedure, then subsequent sheets need only loop twice through the system to receive the adjusted second and fourth images before being transferred to the next station 400. It should be understood that the number of loops can be reduced by providing more than one print engine or at least more than one transfer station.

Thus, while the various techniques of measurement and image location control described herein can be achieved with the same sheet being passed multiple times through the system, many of the same principals can be applied to a printing apparatus in which a sheet, even at the same side of the sheet, is caused to pass through multiple marking/transfer devices. For example, in a color printing apparatus different colors could be applied at different stations. Although a common controller can be used, multiple controllers should be provided with some means to communicate input and/or output in order to coordinate the process. Additionally, it should be understood that while the methods herein are primarily described with regard to performing image sensing on a single sheet, increased accuracy through averaging can be achieved by performing such image sensing on many sheets.

A controller 52 is used to receive sheet and image information from the sensors S, scanners 60, 61 and any other available input devices that can provide useful information regarding the sheet(s) and/or image being handled or transferred in the system. The controller 52 can include one or more processing devices capable of individually or collectively receiving signals from input devices, outputting signals to control devices and processing those signals in accordance with a rules-based set of instructions. The controller 52 can then transmit signals to one or more actuation systems, print engines 54, or other handling devices. Thus, based on the orientation of the images relative to the sheet, as input to the controller, calculation can be made to properly register and/or scale images on the sheet.

Figure 9:
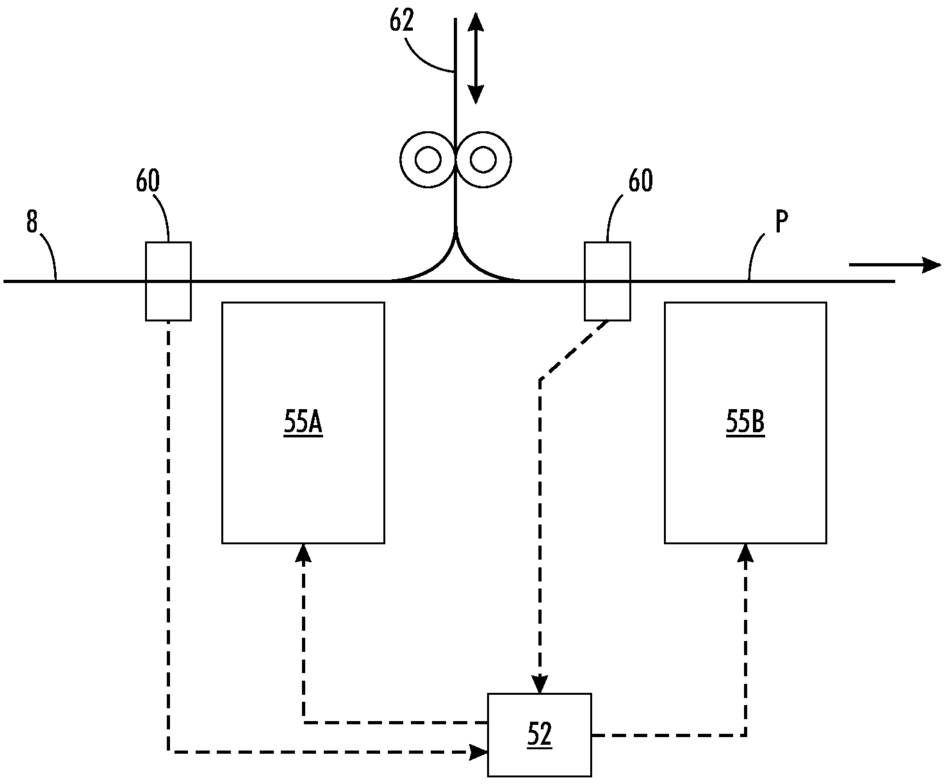
FIG. 9 is a schematic representation of a multiple modular system containing a series of marking devices used for duplex printing in accordance with an aspect of the disclosed technologies.

Often media handling assembly, and particularly printing systems, include more than one module or station. Accordingly, more than one registration system as disclosed herein can be included in an overall media handling assembly. Further, it should be understood that in a modular system or a system that includes more than one registration system, in accordance with the disclosed technologies herein, could detect characteristics of the image or sheet and relay that information to a central processor for controlling registration in the overall media handling assembly. Thus, if further image processing or additional images are to be transferred to a sheet, then this can be achieved with the use of one or more subsequent downstream registration systems, for example in another module or station. In this way, a sheet can move past a series of transfer surfaces, such as to pick up different images, including different color toners. Thus, more than one image is printed onto more than one transfer surface but handling the same sheet. In fact, a first image location can be determined on a first transfer surface and then the information applied to an image printed on a second transfer surface. So in a multiple modular system, as shown in FIG. 9, one machine can include a marking device 55A that transfers an image onto one side of a sheet, then hand it off to another machine including a second marking device 55B to print onto the other side of the sheet.

In general, the methods disclosed herein could be used with any system architecture where the image being transferred to the paper sheet can be measured by using the residual marks left behind after transfer at the corners. For a tandem duplex system where one marking device prints side 1 and the next marking device prints side 2, both marking devices have image sensing devices scanning developed toner images on the transfer surface, such as a photoreceptor belt. Both systems can measure where the same sheet of paper came in and took away the transferred image. Thus, the transfers and measurements happen at different times in the process and on different marking devices. By controlling the placement and the size of the transferred images, maintaining small reference distances from at least three sheet corners, then the resulting print can achieve a good IOP registration. The paper can shrink between marking devices, similar to how it does when the sheet is made to make a second pass in a single engine duplex system. Nonetheless, the shrinkage can be compensated if measureable.

Flexible electrostatographic belt imaging members are an example of a form of transfer surface contemplated herein. Typical electrostatographic flexible belt imaging members include, for example, photoreceptors for electrophotographic imaging systems, electroreceptors such as ionographic imaging members for electrographic imaging systems, and intermediate image transfer belts for transferring toner images in electrophotographic and electrographic imaging systems.

Another example of a form of transfer surface includes an imaging cylinder. Imaging cylinders can include a rotatable drum having an exterior facing dielectric layer having given dielectric properties which are effective to receive and retain electrostatic latent images formed by a closely adjacent ion or print cartridge, operatively coupled to a computer and/or controller that controls the images formed thereon.

The image carried or applied to the transfer surface (belt, imaging cylinder or other) is commonly referred to as a "latent image." The latent image can be formed from toner built-up on the transfer surface in a very particular pattern. This latent image which is now defined by toner, can then be transferred to a substrate medium (like a sheet of paper) as the portion of the transfer surface carrying the latent image moves into force engaging contact with that print medium.

It should be understood that the system in accordance with the disclosed technologies herein is not limited to toner-based systems. Any marking process that transfers a developed or deposited image from a transfer surface to a cut sheet of paper should be able to use this method to measure placement of the image on the paper with respect to the corners and edges of the paper. For example, the image could be printed with an inkjet system, building the image to transfer on an imaging drum. The image could be larger than the cut sheet paper size at the corners. In this way, the marks left behind on the image drum, after transfer, allow measurement of where the image was located with respect to the imprint of where the paper corner was when printing or transferring the image to the paper. This could even be used in a liquid ink developed image system.

In accordance with an aspect of the disclosed technologies, a preliminary latent image includes patches that are used for generating fiducial marks. FIG. 1 shows a schematic plan view of a sheet 10, in engaging contact with a transfer surface 51. The transfer surface 51 carries a first image 5 (also referred to herein as a preliminary latent image—represented in the drawings by dotted-lines) that includes a set of four patches 151-154 separated by blank spaces. It should be noted that while the FIG. 1 preliminary latent image 5 consists entirely of the patches 151-154, further elements could also be included. For example, the preliminary latent image 5 can further include elements from a second image eventually intended for transfer to the sheet without the fiducial marks. The preliminary latent image 5 is carried by the transfer surface 51 prior to engagement with the sheet 10. Thus, when the sheet 10 comes in contact with the transfer surface 51, internal patch portions 161-164 are sandwiched between the transfer surface 51 and the sheet 10. Preferably, the patches 151-154 are configured such that the corners 1-4 of the sheet 10 land inside the patches 151-154. In this way, external portions of the patches are defined, which correspond to fiducial marks 141-145. Once the sheet 10 comes into contact with the patches 151-154, the sheet will adhere to the internal portions 161-164, but not the external portions. Thus, when the sheet moves away from the image transfer station, where it received the patches 151-151, it with take the internal portions 161-164 with it and leave behind the fiducial marks 141-145.

It should be noted that the schematic drawings herein are not to scale. In fact, the size of the fiducial marks, the distances between edges, the lateral position (Y-axis) or process position (X-axis) as well as the skew angles θ are exaggerated in order to more easily visualize and explain the methods, systems and apparatus in accordance with the disclosed technologies. While such sizes, positions, distances and angles are within the scope of the disclosure, they are not intended to limit the disclosure herein.

Figure 2:
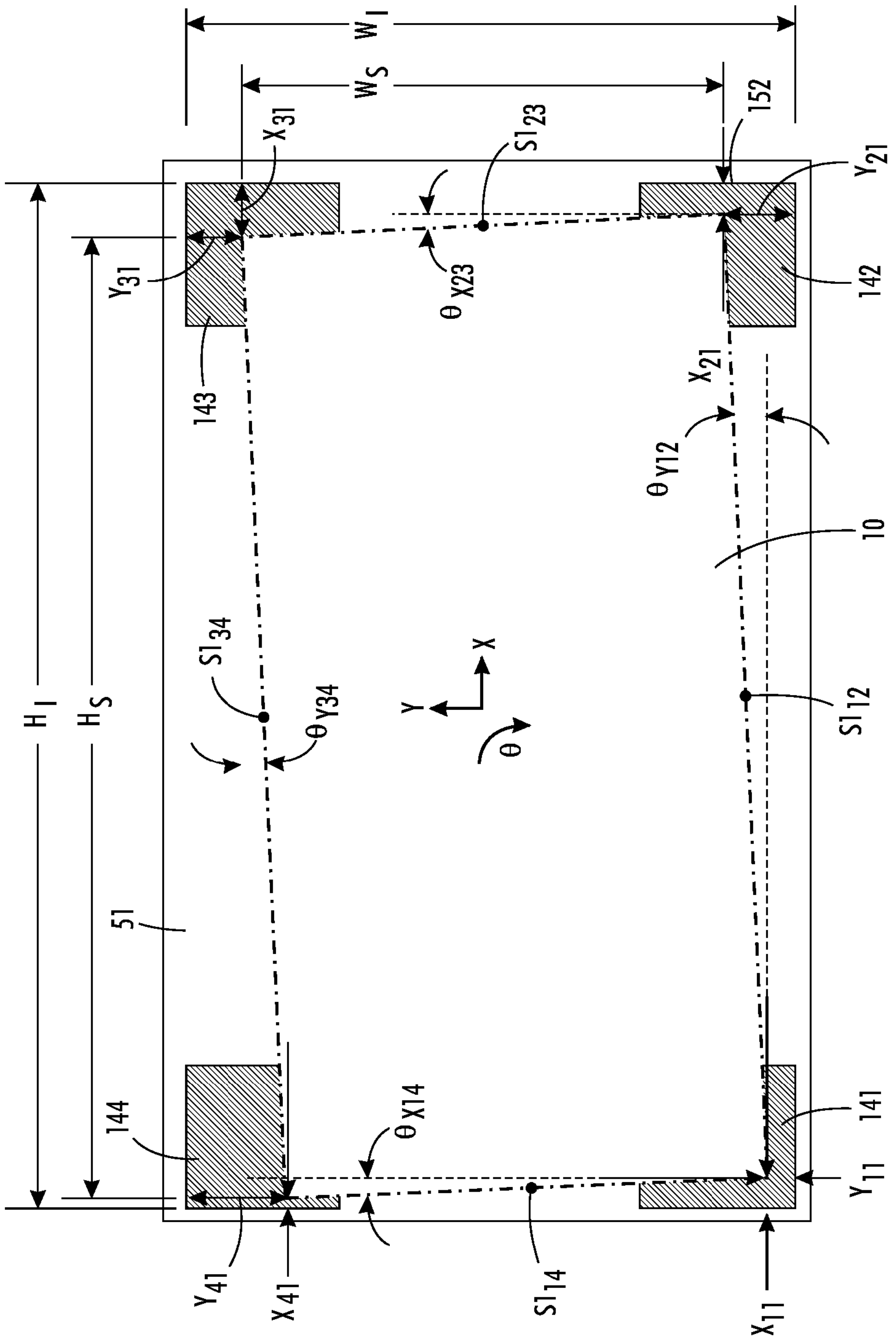
FIG. 2 is a schematic plan view of a set of fiducial marks formed on a transfer surface for adjusting the registration of a images transferred in a media handling assembly in accordance with an aspect of the disclosed technologies.

FIG. 2 shows the transfer surface 51 after the sheet 10 (shown in phantom) has moved on, leaving behind the fiducial marks 141-144 which have formed a partial outline of a periphery of a sheet 10. An "outline" as used herein refers to the line or lines defining the perimeter or bounds of a sheet from a plan view. A partial outline can include only one or more segments of the full sheet outline. The transfer surface 51 is shown in FIGS. 1-5 as a generally rectangular and planar element, which is intended to represent only a portion of a larger recirculating element, such as a photoreceptor belt, an intermediate transfer belt or an imaging drum. In the case of a non-planar transfer surface 51, such as a cylindrical drum, the planar elements shown in the drawings would resemble a linearized representation thereof. Nonetheless, the transfer surface 51 could be formed as a plate or other surface as long as it is able to support and convey a preliminary latent image and subsequent adjusted latent images as described herein.

When contemporary photoreceptor belts, intermediate transfer belts or imaging drums are used, after the latent image is applied to the sheet, further circulation or rotation of the transfer surface 51 causes it to immediately pass through an associated cleaning station (not shown) which substantially removes any remaining solid particulate matter adhering thereto. Also, a discharge assembly (also not shown) can be used to remove any residual electrostatic charge on the transfer surface 51. These systems clear or clean the transfer surface so it can repeat the cycle of collecting a fresh electrostatic latent image for transfer to a subsequent sheet. An aspect of the currently disclosed technologies can still include such latent image cleaning assemblies, but should include a scanning station before the fiducial marks 141-145 are cleaned off. In this way, measurements can be taken of the fiducial marks 141-145.

As shown in FIG. 2, the fiducial marks 141-145 form at least a partial outline of a periphery of the sheet 10. The outline corresponds to the inner edges of the fiducial marks 141-145. As used herein with reference to the fiducial marks, the terms "inner edges" and "outer edges" use the center of the sheet 10, as shown in the plan view drawings, as a point of reference. In this way, the fiducial marks 141-145 each include two inner edges that correspond to the outline of the sheet 10. Each fiducial marks inner edge has an opposed outer edge. The opposed outer edges together form the corner boundaries of a preliminary latent image used as a frame of reference to measure sheets.

The methods and systems used herein consider the outer edges of the preliminary latent image and accordingly each fiducial marks to be a known positional input, since the position of those edges on the transfer surface 51 are predictable. In contrast, due to sheet skew and positional errors in the lateral or process directions the position of the fiducial mark inner edges is less predictable. Any span extending from one edge of a fiducial mark to an opposed edge defines a dimension, which can be measured by a scanner. For example, a span extending perpendicular from a fiducial mark outer edge toward an opposed fiducial mark inner edge defines a dimension. A "dimension" as used herein refers to a measurable linear extent, particularly of a fiducial mark, that is measured from two opposed sides, such as a length, width or other extent. Due to the non-quadrilateral shape of the fiducial marks, the measured dimension need not be one of the longest extents of the mark. The scanner can use the changes in image density to identify fiducial mark edges. Thus, by measuring a dimension that extends perpendicular from an outer edge of the fiducial mark to an inner edge of that mark, the position of a point along the fiducial mark inner edge can be determined. Also, while such measured dimensions of the fiducial marks determine a location of a point along the fiducial mark inner edge, the length of that fiducial mark inner edge may not run parallel to the outer edge (due to sheet skew θ). Accordingly, a desirable point of reference along the fiducial mark inner edges is the point of intersection of the two inner edges that correspond to the respective sheet corners 1-4. In fact, it can be desirable to determine the dimension from an outer corner of the fiducial mark to an inner corner of the fiducial mark that represents the sheet corner.

Figure 6:
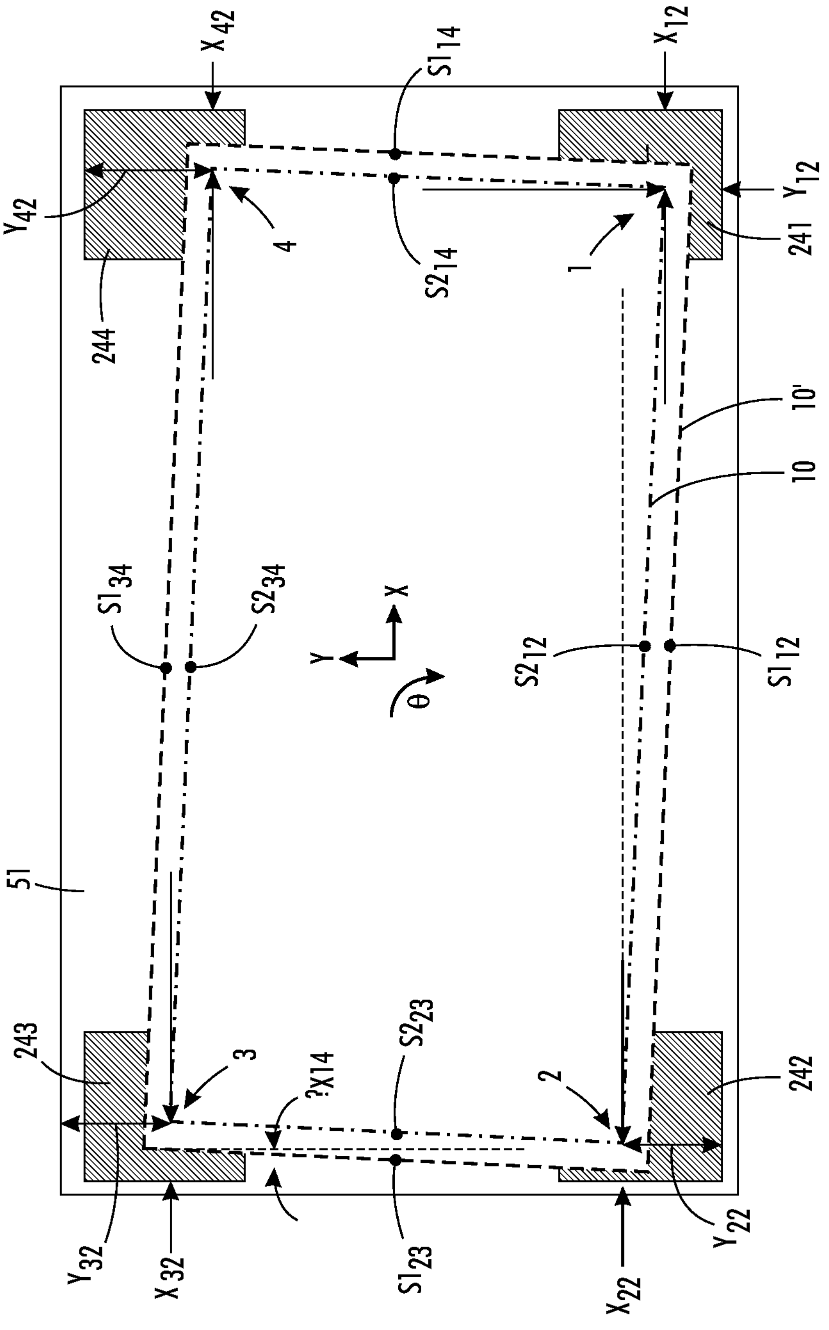
FIG. 6 is a schematic plan view of a subsequent set of fiducial marks formed on a transfer surface for adjusting the registration of a images transferred in a media handling assembly in accordance with an aspect of the disclosed technologies.

As shown in FIG. 2, each of the fiducial marks 141-145 has a measured fiducial mark dimension in each of the lateral directions (either up or down along the Y-axis) and along the process direction (either left or right from the X-axis origin). In this way, the fiducial mark 141 shown in the bottom left corner of FIG. 2 (corner 1) includes lateral dimension $Y_{11}$ and process dimension $X_{11}$. Similarly, fiducial marks 142, 143 and 144 have lateral/process dimensions $Y_{21}/X_{21}$, $Y_{31}/X_{31}$ and $Y_{41}/X_{41}$ respectively. Because the fiducial mark outer edges are located in relative close proximity to the sheet corners, the dimensions $Y_{11}/X_{11}$, $Y_{21}/X_{21}$, $Y_{31}/X_{31}$ and $Y_{41}/X_{41}$ preferably represent relatively short distances. For notation purposes, the first digit of the subscript denotes the corresponding sheet corner and the second digit denotes one of two planar sides of the sheet. Thus, as FIG. 6 illustrates side 2 of the sheet 10, the subscript for those dimensions all end in the number 2. Those dimensions can be correlated or associated with a common reference point, such as the center of the preliminary latent image, the center of the sheet or any other point relative to the sheet or the mark(s).

Using the a center of the preliminary latent image a reference frame, a center point can be designated as the origin of the X-Y coordinates. Alternatively, any other point, such as a preliminary latent image corner or sheet corner, could be the origin. Preferably, those axes extend respectively parallel and perpendicular to the process and lateral directions. In this way, the measurements taken with regard to each corner determine a position of that corner relative to the system and a central point of the sheet, along both the X-axis and Y-axis.

The measurements provide a frame of reference between the sheet and the marking device. That frame of reference uses the preliminary latent image, including the fiducial marks, as an absolute image size, which can be known or input before hand. Thus, by knowing the absolute image size of the preliminary latent image, the measurements will reveal the size of the sheet. Additionally, the measurements will quantify image shear, skew and/or image positioning along the axes. This will provide the system controller with the information about how much a subsequent transfer image needs to be adjusted in order to eliminate skew and position the transfer image as desired. Further, if the absolute image size is not going to be maintained for the transfer image, then the controller can use the measurements to adjust the image magnification (size), for example relative to the sheet size, with or without predesignated margins from the sheet edges, or a different image size.

It should be understood that throughout the embodiments disclosed herein that the measurements of less than all four corners, such as only three corners, can be used, while estimating the location of the non-measured corners based on the assumption that the sheet is rectangular. Similarly, if less than four corners are going to be measured, patches can similarly only be applied to those corners being measured.

Figure 3:
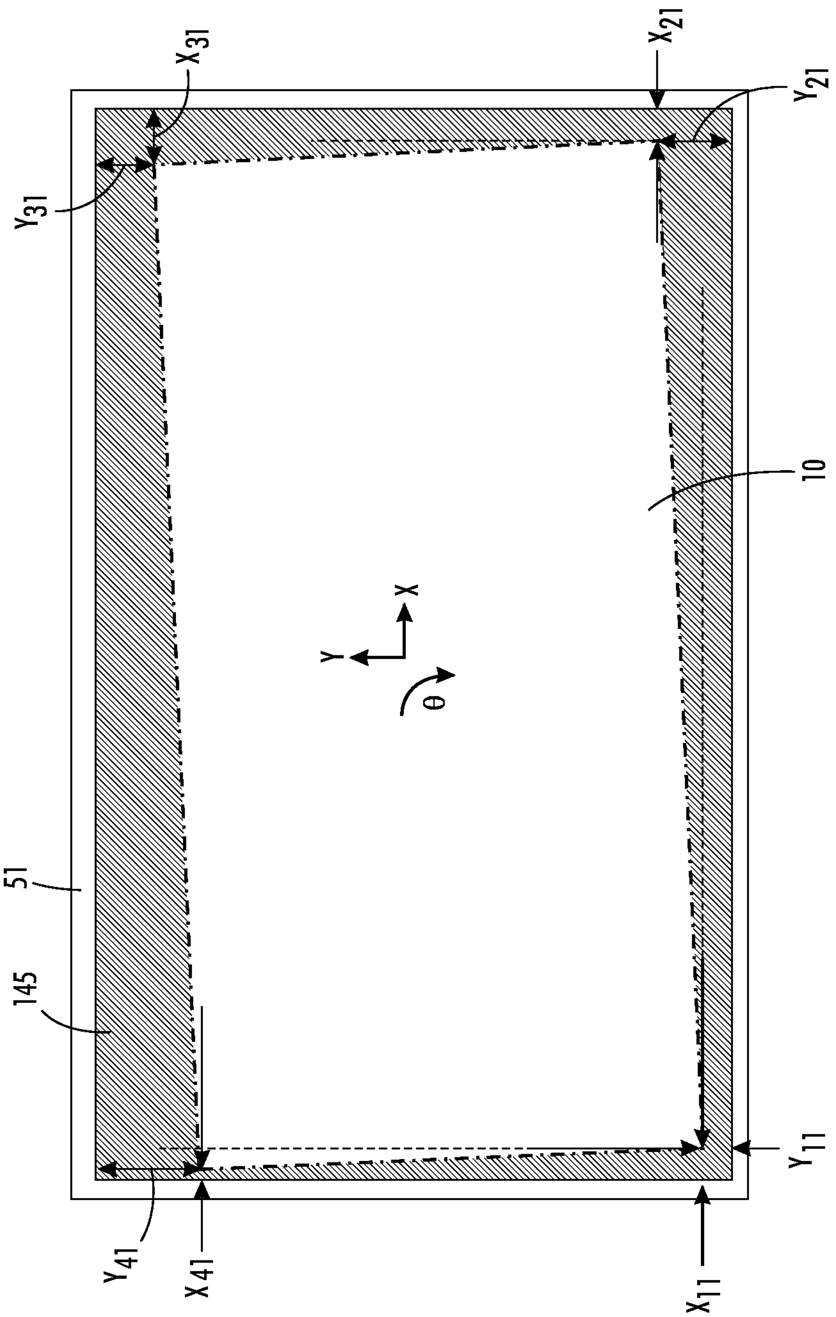
FIG. 3 is a schematic plan view of an alternative fiducial mark formed on a transfer surface for adjusting the registration of a images transferred in a media handling assembly in accordance with an aspect of the disclosed technologies.

It should be further understood that fiducial marks can be formed as other shapes (geometric or otherwise) and even other configurations. For example, the fiducial marks need not be solid marks with their inner portions filled-in or shaded. As yet a further alternative, the patches could be formed by a series of marks, such that regardless of how many in the series did not land on the sheet, there would remain others in the series that remained behind on the transfer surface for measurement. Also, the marks could consist of or include small circles or even bulls-eye designs (concentric circles), whose center can be found by an image processing system. FIG. 3 shows an alternative fiducial mark 145 that uses the entire area of the preliminary latent image to form a single continuous mark that surrounds the entire sheet 10, leaving a blank inner region forming a silhouette of the sheet once it has moved on.

Figure 4:
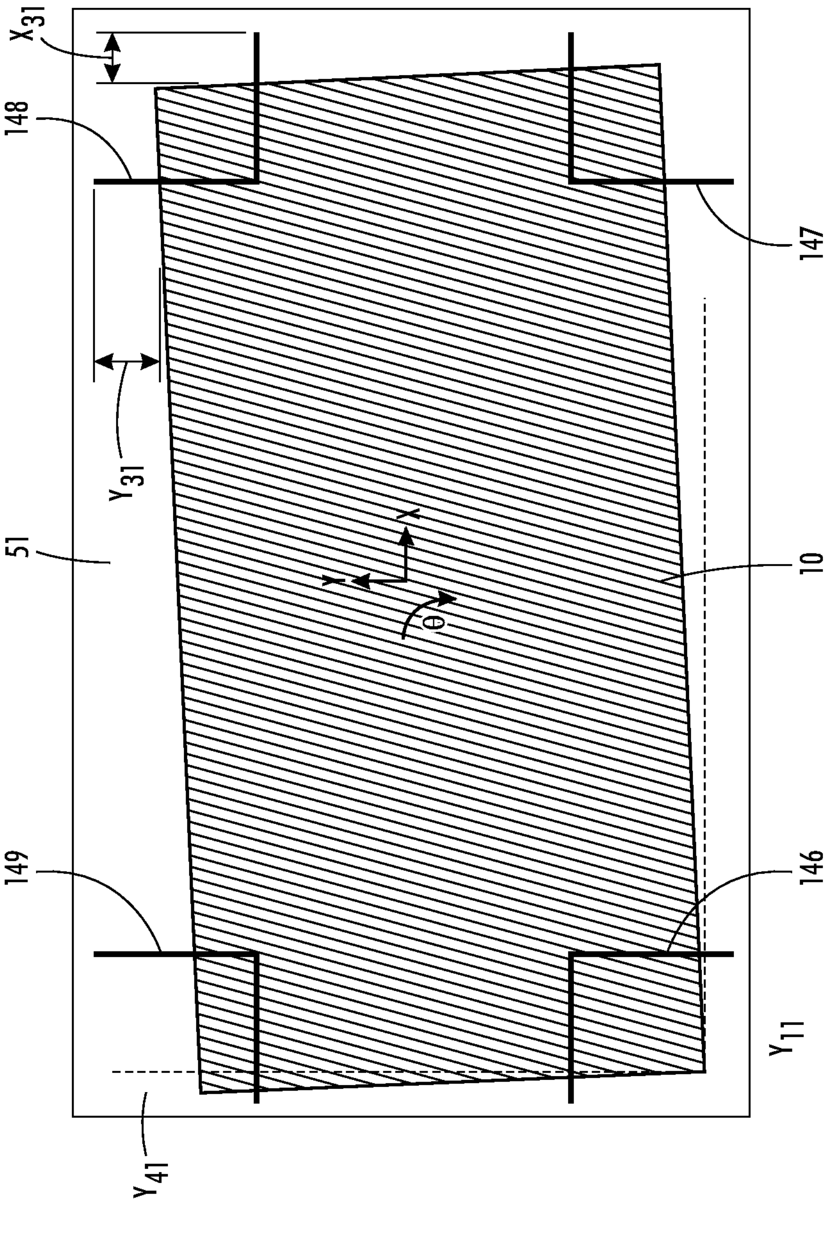
FIG. 4 is a schematic plan view of a sheet on a transfer surface with an alternative first image there between for adjusting the registration of a images transferred in a media handling assembly in accordance with an aspect of the disclosed technologies.

FIG. 4 shows yet a further alternative set of patches 146-149, each formed by a line in the process direction and an intersecting line in the lateral direction. As with patches 151-154 described above, the inner portions get carried away with the sheet 10, leaving outer portions in the form of a process direction line and a lateral direction line for each mark. The length of these line-type fiducial marks, for example $X_{31}$, $Y_{31}$, can be used to estimate the position of each sheet corner.

Further still, the fiducial marks can be provided in a form that is not easily visible to the naked eye, but is visible to an image sensing device (for example using a yellow ink). Alternatively, the fiducial marks could be visible to the naked eye, but intended to be trimmed-off after the more centrally located main transfer image is fused to the sheet. Also, the marks may be intended to remain on the sheets for use in a later process.

Several control objectives can be achieved for IOP registration using the fiducial mark measurements described herein. The measured fiducial mark dimensions can be used to adjust image size, image shear, image target location and image target orientation. Below are exemplary formulaic calculations of IOP registration errors using the fiducial marks described above. The first formulaic example uses a center of the preliminary latent image 5, which can correspond to a center of the transfer surface 51, as the axes origin and reference point for both sides 1 and 2. The below equations could be modified accordingly to accomplish different control objectives, including different location parameters. Thus, predesignated margins from two edges could be used or the image(s) could be targeted to be located relative to a different reference point, like a fiducial mark corner or a sheet corner. By varying the objectives, the below equations would be modified to use the alternative reference point(s), rather than the center point used in the equations below.

Image Centering

For an image to be centered on a sheet along the X-axis, an average position must be determined for the leading and trailing edges of the sheet relative to the center of the preliminary latent image. Thus, with reference to FIG. 2, using the measurements from the fiducial marks 141-144, an average measured sheet edge position can be derived from the following:

$$S1_{14}=(X_{11}+X_{41})/2 \quad (1a);$$

$$S1_{23}=(X_{21}+X_{31})/2 \quad (1b).$$

Thus, the deviation or error from the marks being centered on the sheet at least along the X-axis (the process direction) is calculated by determining half of the difference between the two measured margins, according to:

$$X_1\text{ error}=(S1_{14}-S1_{23})/2$$

$$X_1\text{ error}=(X_{11}+X_{41}-X_{21}-X_{31})/4 \quad (2).$$

Similarly, for the image to be centered along the Y-axis (laterally), an average measured sheet edge position can be derived from the following:

$$S1_{12}=(Y_{11}+Y_{21})/2 \quad (3a);$$

$$S1_{34}=(Y_{31}+Y_{41})/2 \quad (3b).$$

Thus, the error from having a centered image on the sheet, at least along the Y-axis, is calculated according to:

$$Y_1\ \text{error}=(Y_{11}+Y_{21}-Y_{31}-X_{41})/4 \quad (4).$$

Image Skew Adjustments

Another control objective might be to adjust or correct an image target orientation, such as to correct for sheet skew relative to the marking device. Thus, a skew angle θ can be calculated using the fiducial mark measurements along the X-axis or the Y-axis using any edge, according to the following:

$$\theta_{X23}=\tan^{-1}\{(X_{31}-X_{21})/H_S\} \quad (5a);$$

$$\theta_{X14}=\tan^{-1}\{(X_{11}-X_{41})/H_S\} \quad (5b);$$

$$\theta_{Y12}=\tan^{-1}\{(Y_{21}-Y_{11})/W_S\} \quad (5c);$$

$$\theta_{Y34}=\tan^{-1}\{(Y_{41}-Y_{31})/W_S\} \quad (5d).$$

Each of the above skew angles $\theta_{X23}$, $\theta_{X14}$, $\theta_{Y12}$, $\theta_{Y34}$, which are shown in FIG. 2, can individually be used to determine and correct for sheet skew. In the equations above, $W_S$ and $H_S$ represent a length that each edge of the sheet 10 extends along the Y-axis and the X-axis, respectively, which coordinates use the transfer surface as a frame of reference. As an alternative, the actual sheet dimension and height can be used as an estimate to these values, but such would have to be entered by an operator manually as an input variable, or measured by other means. However, considering that measurements are hereby being made of the fiducial marks 141-144, the sheet lengths $W_S$ and $H_S$ along the respective axis can be derived using a known dimension $W_I$ and height $H_I$ of the preliminary latent image 5. While the dimensions can represent an absolute preliminary latent image size, they could alternatively be manually or otherwise input into the system. Although FIG. 2 shows $W_S$ and $H_S$ extending from corner to corner across a single edge, both opposed edges of the sheet outline can be used to derive average values for sheet lengths $W_S$ and $H_S$ as follows:

$$W_S=W_I-(Y_{11}+Y_{21}+Y_{31}+Y_{41})/2;\ \text{and}$$

$$H_S=H_I-(X_{11}+X_{21}+X_{31}+X_{41})/2.$$

Additionally, an average skew angle θ using opposed parallel edges can be calculated for adjusting image orientation according to:

$$\theta_{X1}=(\theta_{X23}+\theta_{X14})/2$$

$$\theta_{X1}=\tan^{-1}\{(X_{31}-X_{21}+X_{11}-X_{41})/(2*H_S)\} \quad (6a);\ \text{or}$$

$$\theta_{Y1}=(\theta_{Y12}+\theta_{Y34})/2$$

$$\theta_{Y1}=\tan^{-1}\{(Y_{21}-Y_{11}+Y_{41}-Y_{31})/(2*W_S)\} \quad (6b);$$

and then using small angle approximation, which assumes the $\tan^{-1}$ insignificant, equations 6a, 6b yield the following:

$$\theta_{X1}=(X_{31}-X_{21}+X_{11}-X_{41})/(2*H_S) \quad (7a)$$

$$\theta_{X1}=\frac{(X_{31}-X_{21}+X_{11}-X_{41})}{(2H_I-(X_{31}+X_{21}+X_{11}+X_{41}))};$$

or $$\theta_{Y1}=(Y_{21}-Y_{11}+Y_{41}-Y_{31})/(2*W_S) \quad (7b)$$

$$\theta_{Y1}=\frac{(Y_{21}-Y_{11}+Y_{41}-Y_{31})}{(2W_I-(Y_{21}+Y_{11}+Y_{41}+Y_{31}))};$$

As a further alternative using all four edges, the skew angle is calculated according to:

$$\theta_{XY1}=(\theta_{X1}+\theta_{Y1})/2$$

which expands to:

$$\theta_{XY1}= \quad (8)$$

$$(X_{31}-X_{21}+X_{11}-X_{41})/(4*H_S)+(Y_{21}-Y_{11}+Y_{41}-Y_{31})/(4*W_S)$$

$$\theta_{XY1}=\frac{(X_{31}-X_{21}+X_{11}-X_{41})}{2(2H_I-(X_{31}+X_{21}+X_{11}+X_{41}))}+\frac{(Y_{21}-Y_{11}+Y_{41}-Y_{31})}{2(2W_I-(Y_{21}+Y_{11}+Y_{41}+Y_{31}))}.$$

Using fewer corners to calculate the skew angle will make the calculations less sensitive to errors in squareness. Such squareness errors can occur from ROS skew, which effectively causes a sheer in the printed image such that it becomes slightly trapezoidal, rather than square. The sheer is often one-dimensional, thus by measuring skew angle based on edges that are not skewed by the ROS skew, the calculations can still correct for other skew without considering the ROS skew. For example, if the ROS skew is creating a sheer angle with respect to the Y-axis, skew measurements can be derived using only the edges parallel to the X-axis, such that IOP registration is insensitive to the ROS skew error.

Figure 5:
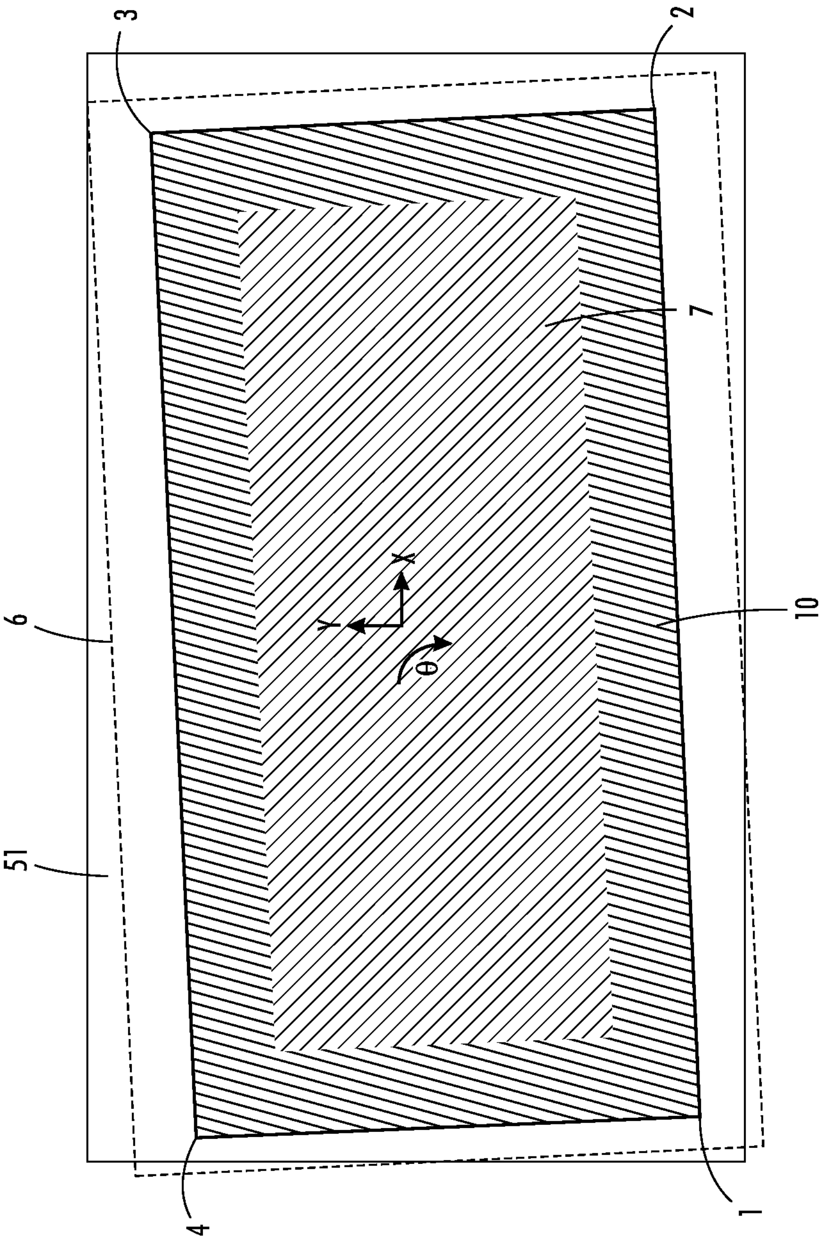
FIG. 5 is a schematic plan view of a sheet with an adjusted second image applied thereto in accordance with an aspect of the disclosed technologies.

Accordingly, the above described measurements of the fiducial marks can be used to keep the image magnification (size) unchanged. When maintaining an absolute image size, the measurements can be used to ensure proper image registration, such as image orientation (in terms of removing skew) and/or image positioning relative to some point on the sheet (such as the center or a corner). FIG. 5 shows another sheet 10 engaged with the transfer surface 51. A second image 6 is shown applied to the sheet, wherein the second image 6 is adjusted based on measurements from first image on one or more prior sheets. The second image 6 has been centered and rotated to match the skew of the sheet 10. The second image 6 is also represented by dotted lines as a comparative example relative to the first image 5. However, as illustrated, the second image 6 does not include fiducial marks, but merely an intended transfer image 7 that is both centered and properly oriented relative to the sheet 10.

Alternatively, measurements of image sheer, such as ROS skew or the image not being square with respect to the sheet edges (assuming the sheet is rectangular) can be determined by taking the difference between equations 7a and 7b above. Using such image sheer determinations, a system actuator could be used to square the image relative to the sheet and eliminate or minimize the sheer. In this way, the image is adjusted to compensate for measured image shear. However, if no such sheer adjustment is available yet image sheer is determined to exist, using a greater number of sheet edges for calculating the skew can help determine an average skew.

Duplex Imaging

In a duplex printing process, an aspect of the disclosed technologies can be used to measure fiducial marks on side 2, which as above can be used to adjust the image transferred to that second side. Although measurements for sheet size were determined for side 1, shrinkage of the sheet can occur after fusing the inner portions 161-164 of the of the preliminary latent image onto side 1. Also, the sheet size could have changed due to other modifications or alterations to the sheet prior to the side 2 image transfer step. Thus, below is an exemplary formulaic calculation of IOP registration errors for centering and/or orienting the side 2 image on the same sheet of paper as side 1.

As with side 1, on side 2 measurements are taken of the fiducial marks relative to the representation of the sheet edges (the sheet outline represented by the inner edges of the fiducial marks). Using the same methods as above, the following formulas should hold true for calculating the average sheet edge positions:

$$S2_{14}=(X_{12}+X_{42})/2 \quad (9a);$$

$$S2_{23}=(X_{22}+X_{32})/2 \quad (9b).$$

The side 2, X-axis error from center is calculated according to:

$$X_2\ \text{error}=(X_{12}+X_{42}-X_{22}-X_{32})/4 \quad (10).$$

Similarly, the Y-axis sheet edge positions are determined by:

$$S2_{12}=(Y_{12}+Y_{22})/2 \quad (11a);$$

$$S2_{34}=(Y_{32}+Y_{42})/2 \quad (11b).$$

Thus, for side 2 the Y-axis error from center is calculated according to:

$$Y_2\ \text{error}=(Y_{12}+Y_{22}-Y_{32}-X_{42})/4 \quad (12).$$

Further, as above the skew angle θ can be calculated in accordance with formulas (5a-8), but using the side 2 measurements along the X-axis, the Y-axis and/or an average between both axes. As with side 1, an absolute image size can be maintained and formulas (5a)-(12) used with side 2 variable to properly register the image, thereby adjusting the image orientation and/or location on the sheet.

Yet another control objective might be to adjust the image size. Thus, the transfer image can be scaled to fit a predefined sheet margin, based relative to the determined sheet size. In this way, by knowing the difference between the desired sheet margins and the above measurements, the image magnification (size), as well as the shear, orientation and location, can be adjusted to make the adjusted transfer image have the desired parameters. Alternatively, scaling can be performed to match the side 2 image to the size of the side 1 image, which may have experienced shrinkage after being fused onto side 1. Such shrinkage can occur when moisture is driven out of the paper during the fusing of the images from sides 1 and 2. Also, front to back magnification errors can come from machine settings or incorrect adjustments of predicted shrinkage. Thus, regardless of whether an absolute magnification was maintained or modified for the transfer image placed on side 1, the side 2 transfer image can be scaled as desired. When scaling the image transferred to side 2, a comparison can be made between fiducial mark measurements for both sides of the sheet. As with side 1, the measurements for side 2 can be used to determine a new sheet size relative to the location of the fiducial marks.

FIG. 6 illustrates a plan view of the transfer surface 51 after sheet 10 (shown in phantom lines) was inverted and side 2 engaged therewith, along with a third latent image between the transfer surface 51 and the sheet 10. Using a sheet inverter the previously leading edge of the sheet 10 (with corners 1, 4) is now the trailing edge. As with the preliminary latent image applied to side 1, the third image included patches (not shown) that generated fiducial marks 241-244 forming an outline of the new sheet periphery. For illustrative purposes the original inverted sheet periphery 10' is also shown in dotted lines.

The sheet 10 could have changed size, during for example the fusing process, thus creating a disparity between the images intended for sides 1 and 2. The measurements of the fiducial marks relative to the sheet edges from both sides of the sheet can be used to directly calculate the necessary image magnification adjustment(s) needed to match the size of subsequently transferred images on both side 1 and side 2.

In accordance with an aspect of the disclosed technologies, the size adjustment needed to match the side 2 image to that of the side 1 image can be calculated using an averaging of sheet edge measurements from both sides. Error in the actual image dimensions in calculating the skew angle can be considered negligible. It can also be assumed that the skew angle is small such that the calculation of X and Y magnification adjustments are independent of the skew. As shown in FIG. 6, the position of $S1_{12}$ (calculated from side 1) represents the average position measured on side 1 for edge 12 (the bottom edge as shown in the drawings) along the Y-axis. Similarly, for side 1 the positions $S1_{14}$, $S1_{23}$ and $S1_{34}$ can be calculated according to formulas 1a, 1b and 3b, respectively. Now applying the same methods for determining an average edge position for side 2, the positions $S2_{12}$, $S2_{23}$, $S2_{34}$ and $S2_{14}$ can be represented as:

$$S2_{12}=\tfrac{1}{2}(Y_{12}+Y_{22}); \quad (13);$$

$$S2_{23}=\tfrac{1}{2}(X_{22}+X_{32}); \quad (14);$$

$$S2_{34}=\tfrac{1}{2}(Y_{32}+Y_{42});\ \text{and} \quad (15);$$

$$S2_{14}=\tfrac{1}{2}(X_{12}+X_{42}) \quad (16).$$

Thus, the cumulative measurements along the X-axis and the Y-axis can be compiled to represent the total change in size from side 1 to side 2 as follows:

$$X_{(side1-side2)}=(S1_{14}-S2_{14})+(S1_{23}-S2_{23}); \quad (17);$$

$$Y_{(side1-side2)}=(S1_{12}-S2_{12})+(S1_{34}-S2_{34}) \quad (18).$$

Alternatively, equations (17) and (18) can be represented as follows:

$$X_{(side1-side2)}=\tfrac{1}{2}[(X_{21}+X_{31}-X_{22}-X_{32})+(X_{11}+X_{41}-X_{12}-X_{42})] \quad (19);$$

$$Y_{(side1-side2)}=\tfrac{1}{2}[(Y_{11}+Y_{21}-Y_{12}-Y_{22})+(Y_{41}+Y_{31}-Y_{42}-Y_{32})] \quad (20).$$

Above, $X_{(side1-side2)}$ and $Y_{(side1-side2)}$ represent the differences respectively, along the X-axis only and the Y-axis only, between the side 2 sheet edges and the side 1 sheet edges. Accordingly, the measured difference along the X-axis is translated into a magnification adjustment, which can be used to scale the side 2 transfer image in the X-axis direction as follows.

$$X\text{mag}\ [\%]=[X_{(side1-side2)}/H_S]*100[\%] \quad (27).$$

Similarly, the measured difference along the Y-axis is translated into a relative magnification adjustment, which can be used to adjust the side 2 transfer image in the Y-axis direction as follows:

$$Y\text{mag}\ [\%]=[Y_{(side1-side2)}/W_S]*100[\%] \quad (28).$$

Figure 7:
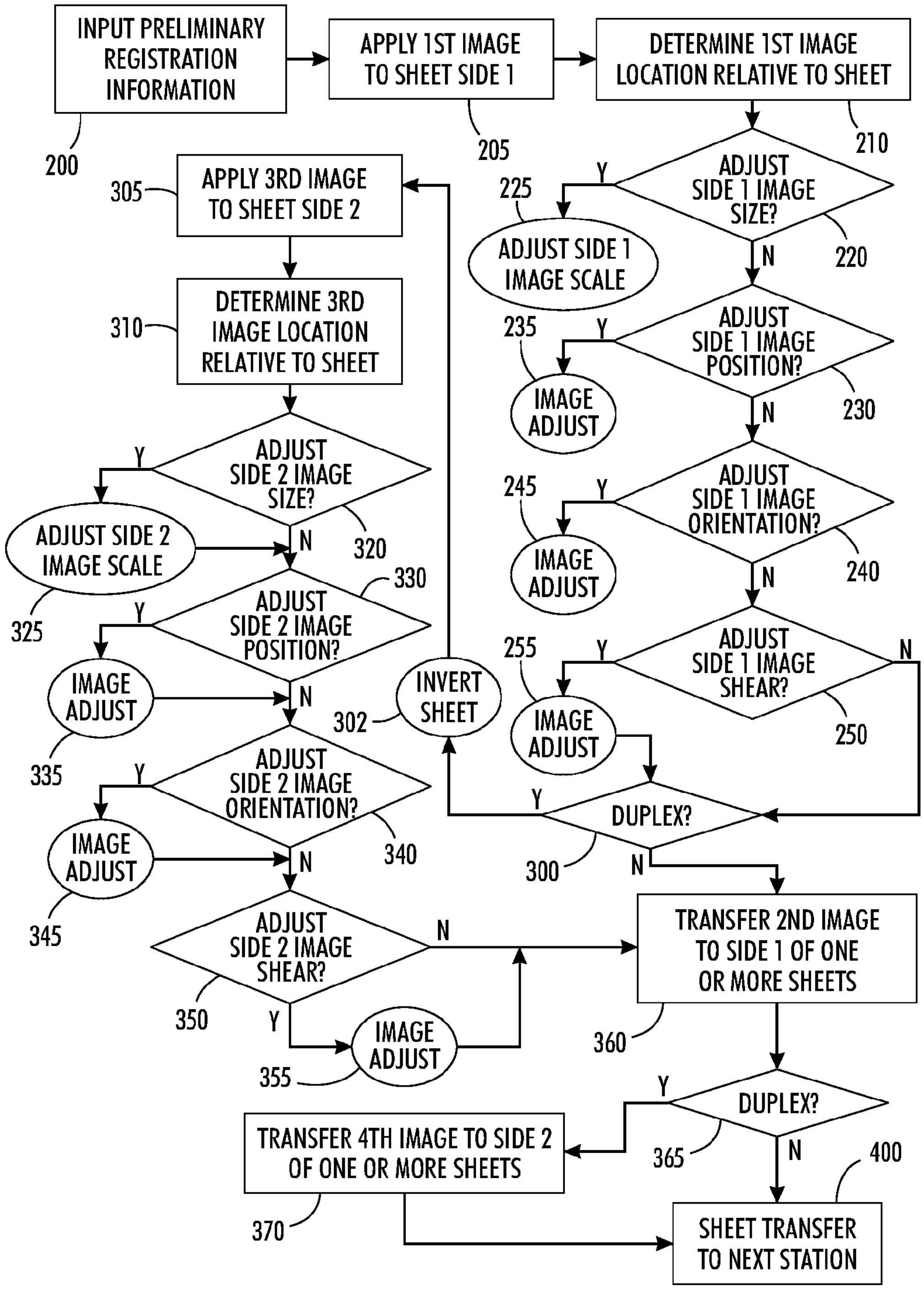
FIG. 7 is a flowchart outlining a method of adjusting the registration of an image in an image transfer assembly in accordance with aspects of the disclosed technologies.

FIG. 7 shows a flowchart outlining a method of adjusting the registration of an image in simplex or duplex image transfer systems in accordance with aspects of the disclosed technologies. For reference purposes, the preliminary latent image 5 that includes at least one fiducial mark will be referred to as a first image. In accordance with the methods herein, the location of first image relative to a sheet is determined based on measurements of the fiducial marks. Such location information defines at least a partial outline of periphery of a sheet, which can be used to derive the size of the sheet as well as any changes needed to the image size, shear, location and orientation. Using the side 1 sheet location determined from measurements, adjustments can be made so that further images transferred to subsequent sheets will be adjusted as desired. Such further images will be referred to herein as a second image. That second image may or may not include the fiducial marks and thus is characterized as a second image. However, it should be understood that the second image could be virtually the same as the first image, but for the adjustments made after measurements are taken. Nonetheless, it is the adjusted version of that second image that gets transferred to one or more subsequent sheets. In a duplex printing environment the fiducial marks generated based on the second side of the sheet (side 2) will similarly be measured. Thus for clarity, the preliminary image on side 2 of the sheet is referred to herein as a third image. Accordingly, the subsequent image that gets adjusted and transferred to side 2 is referred to herein as the fourth image.

The methods disclosed herein can include certain aspects, such as the input of preliminary registration information 200. Preliminary registration information 200 can indicate certain job parameters such as details regarding the dimensions or measuring points of the fiducial marks, the sheets or what type of printing is desired, such as simplex/duplex, scaling or positioning parameters.

FIG. 7 further shows that in step 205, the first image is applied to a first side of a sheet. This includes transferring a portion of the patches described above to the sheet and leaving behind the fiducial marks. Once the fiducial marks are formed on the transfer surface the first image location relative to the sheet can be determined in step 210. As described above, the determination of the image location entails the various measurements relative to the edges, particularly the corners, of the sheet. Preferably, all four corners or at least three corners are measured. The measurements include at least one dimension for each of the measured fiducial marks. The measured dimensions extending from an inner edge of the fiducial mark, that forms at least a partial outline of a periphery of the sheet, to an opposed outer edge of the fiducial mark. Preferably, at least two dimensions are measured for each fiducial mark and those dimensions are measured from the intersection of two inner edges of the fiducial mark representing a sheet corner.

Once the first image location is determined, preferably a processor working as part of a system controller will use the measurements to make appropriate adjustments to a second image which is intended to be transferred to the sheet. Thus, a series of steps 220-255 are included that make those adjustments to the second image. It should be understood that the decision steps 220, 230, 240, 250 can be performed in a different order or simultaneously. Nonetheless, as adjustments to image size can impact all the other adjustments, there are advantages to performing step 220 before the others. Thereafter, in the case at step 220 that the absolute image size of the second image is being adjusted, the methods proceed to step 225 which adjusts the second image scale. However, if such absolute image size was input in the preliminary registration information 200 to remain unchanged, then the method would proceed to the next step 230, wherein the next decision is made regarding adjustment of the image location. If no image location adjustment needs to be made, the process can continue to step 240. Otherwise, the second image would be adjusted at 235 and proceed to step 240 to determine whether the second image orientation needs to be adjusted. Then if the image orientation needs to be adjusted, that would happen at step 245. Otherwise, the controller can make such orientation adjustments in step 245 and further proceed to step 250, to decide whether image shear needs to be adjusted. If no image shear adjustment needs to be made, the process proceeds to step 300. Otherwise, any image shear adjustments would happen at step 255 before proceeding to step 300.

In a simplex (single sided) printing situation, the method can proceed from step 300 to step 360 where the adjusted second image is transferred to side 1 of one or more sheets, after which the sheets proceed to the next station 400. Otherwise, in a duplex printing situation step 300 will be answered in the affirmative and the process will proceed to step 305. In fact, where duplex printing is not an option, the process can proceed directly from any applicable portions of steps 220-255 to next station 400.

As with the simplex image registration determinations and adjustments noted above with regard to steps 210-255, similar procedures can be performed with respect to the other side of the sheet (side 2) for duplex printing. If duplex printing is being performed the method proceeds from step 300 to step 302 for sheet inversion (where the sheet gets flipped over). Once the sheet is inverted for the duplex process, a third image is applied to side 2 of the sheet in step 305. Once again, this includes transferring a portion of new patches to the second side of the sheet forming side 2 fiducial marks. Thus as with side 1, once the fiducial marks are formed, a determination can be made as to the $3^{rd}$ image's location relative to the sheet in step 310.

Thereafter, determinations and adjustments to a fourth image are made in steps 320-355, similar to those made with respect to side 1. It should be understood that the determinations and adjustments with regard to side 2 can be and often are different from those made with regard to side 1. For example, an absolute image size can be maintained for the second image transferred to side 1, while scaling is performed for the fourth image transferred to side 2, in order to match the size of the second image and account for sheet shrinkage. Similarly, changes in polarity from side 1 to side 2 often dictate the adjustments be different. Accordingly, in step 320 adjustments are made to a fourth image for the second side of the sheet. Again, the determination for step 320 can be part of the preliminary registration information input in step 200, can be an automatic setting or can be based on other variables as desired. If the absolute image size is going to be maintained, the process can proceed to step 330 to decide whether the image location needs to be adjusted. Otherwise, if absolute image size is not being maintained, a scaling adjustment can be performed at step 325 and then proceed to step 330. Similarly, if the fourth image location does not need to be adjusted, the process can proceed to step 340 to decide whether orientation of the fourth image needs to be adjusted. Otherwise, the image can be adjusted in step 335 and then proceed to step 340. If the image orientation does not need to be adjusted, the process can proceed to step 350 do decide whether any shear in the fourth image needs to be adjusted. Otherwise, the image can be adjusted in step 355 before proceeding further. As above, it should be noted that the order of determination of the image location or orientation can be made changed and/or performed differently or simultaneously as desired. Alternatively, the image adjustment steps 225, 235, 245, 255 on side 1, as well as the image adjustment steps 325, 335, 345, 355 on side 2 can be decided in almost any order depending on the nature of the printing.

In a duplex printing situation, once both sides have been measured and any necessary image adjustments have been determined and made, the adjusted second and fourth images can be transferred to subsequent sheets. Accordingly, the adjusted images are transferred in steps 360 and 370. In a simplex printing setup, the decision at step 365 is "no", so the method proceeds to step 400. However in duplex printing, after the second image is transferred 360, the decision at step 365 is "yes", so that the fourth image can be transferred to side 2 of the sheets. Thus, after the adjusted fourth image is transferred to side 2 of the one or more sheets, those sheets can be transferred to the next station at step 400. Such further stations could include further processing or a document delivery station such as sheet sorting or stacking trays. As a further alternative, the $2^{nd}$ image can be transferred to side 1 of each sheet (as in step 360) before proceeding to inverting the sheet at step 302 and making the further $4^{th}$ image adjustment determinations. Also, as yet a further alternative, the $4^{th}$ image can be transferred to side 2 of each sheet (as in step 370) before the $2^{nd}$ image is transferred to side 1 of each sheet (as in step 360).

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method of adjusting the registration of an image printed on sheets in a marking device, wherein the sheets each include a periphery defined by edges of the sheets, the method comprising:

determining a first image location relative to a first sheet by measuring at least one dimension of a side-one fiducial mark disposed directly on a first transfer surface, the side-one fiducial mark formed at least partially by the engagement of the first sheet with the first transfer surface, whereby a first edge of the side-one fiducial mark forms at least a partial outline of a periphery of the first sheet, each measured side-one fiducial mark dimension representing a distance between the first edge of the side-one fiducial mark and a second edge of the side-one fiducial mark, the side-one fiducial mark second edge being disposed remote from the at least partial outline of the first sheet periphery;

adjusting a second image to be printed by changing, relative to a second sheet, at least one of a size, shear, position and orientation of the second image based on the determined first image location;

printing the adjusted second image to the second sheet;

determining a third image location relative to a third sheet by measuring at least one dimension of a side-two fiducial mark disposed directly on a second transfer surface, the side-two fiducial mark formed at least partially by the engagement of the third sheet with the second transfer surface, whereby a first edge of the side-two fiducial mark forms at least a partial outline of a periphery of the third sheet, each measured side-two fiducial mark dimension representing a distance between the first edge of the side-two fiducial mark and a second edge of the side-two fiducial mark, the side-two fiducial mark second edge being disposed remote from the at least partial outline of the third sheet periphery;

adjusting a fourth image to be printed by changing, relative to a fourth sheet, at least one of a size shear, position and orientation of the fourth image based on the determined third image location; and printing the adjusted fourth image to the fourth sheet.

2. The method of claim 1, wherein the at least one dimension includes at least two separate dimensions of the fiducial mark.

3. The method of claim 2, wherein the at least two separate dimensions extend to a different edge of the side-one fiducial mark, wherein the different edges are disposed on different sides of the fiducial mark.

4. The method of claim 1, wherein the at least partial outline includes at least two separate corners of the first sheet periphery.

5. The method of claim 1, wherein the fiducial mark includes at least two separate fiducial marks each forming separate portions of the at least partial outline.

6. The method of claim 1, wherein the adjustment of the second image includes positioning the second image on the second sheet relative to at least one second sheet edge.

7. The method of claim 1, wherein the adjustment of the fourth image includes scaling the fourth image to match the size of the adjusted second image.

8. The method of claim 1, wherein the side-one fiducial mark includes more than one separate fiducial mark, wherein each fiducial mark is spaced apart from each other.

9. The method of claim 1, wherein the first and second transfer surfaces are remote and separate from one another.

10. A system for adjusting the registration of images printed on sheets, the system comprising:

a marking device for transferring images to sheets, the marking device marking a first sheet with a first portion of a first image, wherein when the first image first portion is applied to the first sheet, a second portion of the first image extends beyond a periphery of the first sheet, the first and second image portions forming a common continuous mark, the first image second portion forming a first fiducial mark;

an image sensing device for measuring fiducial marks, the image sensing device measuring at least one dimension of the first fiducial mark, wherein a first edge of the first fiducial mark represents a partial outline of a first periphery of the first sheet, each first fiducial mark measured dimension representing a distance between the first edge of the first fiducial mark and a second edge of the first fiducial mark;

a controller operatively coupled to the marking device and the image sensing device, the controller adjusting a second image by changing relative to a second sheet at least one of a size, shear, position and orientation of the second image based on the measured at least one dimension of the first fiducial mark, whereby the marking device transfers the adjusted second image to the second sheet;

wherein the marking device marks an opposed side of the first sheet with a first portion of a third image, the third image first portion being applied to the first sheet opposed side while a second portion of the third image extends beyond a second periphery of the first sheet, the first and second portions of the third image forming a common continuous mark at least prior to the third image first portion being applied to the first sheet opposed side, the third image second portions forming a second fiducial mark, the image sensing device measuring at least one dimension of the second fiducial mark, wherein a first edge of the second fiducial mark represents a partial outline of the second periphery of the first sheet, each second fiducial mark measured dimension representing a distance between the first edge of the second fiducial mark and a second edge of the second fiducial mark, the controller adjusting a fourth image by changing relative to an opposed side of the second sheet at least one of a size, shear, position and orientation of the fourth image based on the measured at least one dimension of the second fiducial mark, whereby the marking device transfers the adjusted fourth image to the opposed side of the second sheet.

11. The system of claim 10, wherein the adjustment of the second image includes centering the second image on the second sheet.

12. The system of claim 10, wherein the at least one dimension includes at least two separate dimensions of the fiducial mark, wherein each of the at least two separate dimensions extend to a different side of the first fiducial mark.

13. The system of claim 10, wherein the at least partial outline includes at least two separate corners of the first sheet first periphery.

14. The system of claim 10, wherein the first fiducial mark includes more than one corner of the first sheet peripheral partial outline.

15. The system of claim 10, wherein the adjustment of the fourth image includes scaling the fourth image to match the size of the adjusted second image.

16. The system of claim 10, wherein the first fiducial mark includes more than one first fiducial mark, wherein each of the more than one first fiducial marks is spaced apart from each other.

17. The system of claim 16, wherein each of the first fiducial marks is formed closest to a different corner of the first sheet.

18. The system of claim 10, wherein the first fiducial mark includes one continuous fiducial mark, wherein different portions of the one continuous fiducial mark are used to when measuring the first fiducial mark.

* * * * *